(12) United States Patent  (10) Patent No.: US 7,548,331 B2
Ferlitsch  (45) Date of Patent: *Jun. 16, 2009

(54) METHODS AND SYSTEMS FOR PRINT SYSTEM COMPONENT-BASED REMOTE PRINTING

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 736 days.

This patent is subject to a terminal disclaimer.

(21) Appl. No.: 09/683,667

(22) Filed: Jan. 31, 2002

(65) Prior Publication Data

US 2002/0097424 A1  Jul. 25, 2002

Related U.S. Application Data

(63) Continuation-in-part of application No. 09/681,409, filed on Mar. 30, 2001, now abandoned, which is a continuation-in-part of application No. 09/681,208, filed on Feb. 22, 2001, now abandoned, application No. 09/683,667, which is a continuation-in-part of application No. 09/681,416, filed on Mar. 30, 2001, now Pat. No. 7,046,384, which is a continuation-in-part of application No. 09/681,208, filed on Feb. 22, 2001, now abandoned.

(60) Provisional application No. 60/261,132, filed on Jan. 11, 2001.

(51) Int. Cl.
G06F 15/00 (2006.01)
G06F 15/16 (2006.01)

(52) U.S. Cl. ..................... 358/1.15; 709/203

(58) Field of Classification Search ............... 358/1.15, 358/1.16, 1.14; 710/10, 19, 52, 56, 100; 400/70; 709/200, 201, 203, 208; 399/8, 399/9, 16, 81–82
See application file for complete search history.

(56) References Cited

U.S. PATENT DOCUMENTS

| 5,128,878 | A |   | 7/1992  | Gore et al.              |
|-----------|---|---|---------|--------------------------|
| 5,241,397 | A |   | 8/1993  | Yamada ............ 358/296 |
| 5,287,194 | A | * | 2/1994  | Lobiondo ........... 358/296 |
| 5,467,434 | A | * | 11/1995 | Hower et al. ....... 358/1.15 |
| 5,528,734 | A |   | 6/1996  | Sanchez ............ 395/115 |
| 5,547,178 | A |   | 8/1996  | Costello                 |
| 5,550,954 | A |   | 8/1996  | Campbell et al.          |
| 5,630,062 | A |   | 5/1997  | Okutsu                   |

(Continued)

FOREIGN PATENT DOCUMENTS

EP    0738949    12/1996

(Continued)

OTHER PUBLICATIONS

U.S. Appl. No. 09/681,208—Office Action dated Jul. 19, 2007.

(Continued)

*Primary Examiner*—Saeid Ebrahimi Dehkordy
(74) *Attorney, Agent, or Firm*—Krieger Intellectual Property, Inc.; Scott C. Krieger

(57) ABSTRACT

Embodiments of the present invention comprise systems and methods for printing at one or more remote printing devices.

17 Claims, 12 Drawing Sheets

U.S. PATENT DOCUMENTS

| | | | |
|---|---|---|---|
| 5,697,040 A | 12/1997 | Rabjohns et al. | |
| 5,699,495 A * | 12/1997 | Snipp | 358/1.15 |
| 5,822,500 A | 10/1998 | Utsunomiya et al. | |
| 5,845,058 A | 12/1998 | Shaw et al. | 395/114 |
| 5,859,711 A | 1/1999 | Barry et al. | 358/296 |
| 5,867,706 A | 2/1999 | Martin et al. | |
| 5,897,260 A | 4/1999 | Zingher | 400/719 |
| 5,918,988 A * | 7/1999 | H.A.M. Van Oijen | 400/76 |
| 5,940,186 A | 8/1999 | Barry et al. | |
| 5,960,168 A | 9/1999 | Shaw et al. | |
| 5,978,560 A | 11/1999 | Tan et al. | |
| 5,978,650 A | 11/1999 | Fischer et al. | 455/3.1 |
| 5,982,996 A | 11/1999 | Snyders | 395/114 |
| 5,995,721 A | 11/1999 | Rourke et al. | 395/114 |
| 5,995,723 A | 11/1999 | Sperry et al. | 395/114 |
| 6,049,394 A | 4/2000 | Fukushima | |
| 6,055,063 A | 4/2000 | Yang et al. | |
| 6,057,930 A | 5/2000 | Blossey et al. | |
| 6,078,960 A | 6/2000 | Ballard | |
| 6,088,120 A | 7/2000 | Shibusawa et al. | 358/1.15 |
| 6,101,508 A | 8/2000 | Wolff | |
| 6,118,546 A | 9/2000 | Sanchez et al. | |
| 6,148,346 A | 11/2000 | Hanson | |
| 6,157,465 A | 12/2000 | Suda et al. | 358/407 |
| 6,172,765 B1 | 1/2001 | Kawamoto | |
| 6,173,295 B1 | 1/2001 | Goertz et al. | |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,320,667 B1 | 11/2001 | Mitsuhashi | |
| 6,337,745 B1 | 1/2002 | Aiello, Jr. et al. | 358/1.15 |
| 6,348,971 B2 * | 2/2002 | Owa et al. | 358/1.15 |
| 6,348,972 B1 * | 2/2002 | Taniguchi et al. | 358/1.15 |
| 6,397,245 B1 * | 5/2002 | Johnson et al. | 709/203 |
| 6,452,692 B1 | 9/2002 | Yacoub | |
| 6,474,881 B1 | 11/2002 | Wanda | |
| 6,476,927 B1 * | 11/2002 | Schwarz, Jr. | 358/1.15 |
| 6,509,974 B1 | 1/2003 | Hansen | |
| 6,529,286 B1 | 3/2003 | King | |
| 6,552,813 B2 * | 4/2003 | Yacoub | 358/1.1 |
| 6,570,669 B1 * | 5/2003 | Onuma | 358/1.15 |
| 6,580,521 B1 | 6/2003 | Nishikawa et al. | |
| 6,584,503 B1 * | 6/2003 | Carney et al. | 709/224 |
| 6,609,210 B1 | 8/2003 | Onuma | |
| 6,618,167 B1 | 9/2003 | Shah | |
| 6,654,136 B2 * | 11/2003 | Shimada | 358/1.15 |
| 6,654,509 B2 | 11/2003 | Nishikawa et al. | |
| 6,661,531 B1 | 12/2003 | Murphy et al. | |
| 6,665,082 B1 | 12/2003 | Takeoka et al. | |
| 6,697,165 B2 * | 2/2004 | Wakai et al. | 358/1.11 |
| 6,700,678 B1 | 3/2004 | Luman | |
| 6,724,494 B1 | 4/2004 | Danknick | |
| 6,707,568 B1 | 5/2004 | Yu | |
| 6,748,471 B1 | 6/2004 | Keeney et al. | |
| 6,757,071 B1 * | 6/2004 | Goodman et al. | 358/1.13 |
| 6,816,270 B1 | 11/2004 | Cooper et al. | |
| 6,825,943 B1 | 11/2004 | Barry et al. | |
| 6,863,367 B2 | 3/2005 | Hamamoto et al. | |
| 6,981,632 B2 | 5/2005 | Schwartz | |
| 6,956,664 B1 | 10/2005 | Kutty | |
| 6,965,958 B1 * | 11/2005 | Sugiyama | 710/104 |
| 6,985,245 B1 | 1/2006 | Takahashi | |
| 7,031,014 B2 | 4/2006 | Ohwa | |
| 7,046,384 B2 * | 5/2006 | Ferlitsch et al. | 358/1.15 |
| 7,072,057 B1 | 7/2006 | Hansen | |
| 7,081,969 B1 | 7/2006 | Motamed et al. | |
| 7,139,085 B1 | 11/2006 | Sakaguchi | |
| 7,148,980 B2 | 12/2006 | Tominaga | |
| 7,155,669 B1 | 12/2006 | Nakagiri et al. | |
| 7,239,411 B2 | 7/2007 | Kelsey | |
| 2001/0038462 A1 | 11/2001 | Teeuwen et al. | 358/1.15 |
| 2002/0001495 A1 | 1/2002 | Mochizuki | |
| 2002/0027673 A1 | 3/2002 | Roosen et al. | |
| 2002/0042798 A1 | 4/2002 | Takei et al. | |
| 2002/0059489 A1 | 5/2002 | Davis et al. | |
| 2002/0060801 A1 | 5/2002 | Motamed et al. | |
| 2002/0101600 A1 | 8/2002 | Sabbagh et al. | |
| 2002/0101604 A1 * | 8/2002 | Mima et al. | 358/1.15 |
| 2002/0112037 A1 | 8/2002 | Koss | |
| 2002/0113989 A1 | 8/2002 | Ferlitsch et al. | |
| 2002/0138564 A1 | 9/2002 | Treptow et al. | |
| 2002/0163665 A1 | 11/2002 | Iwata et al. | |
| 2002/0186407 A1 | 12/2002 | Laughlin | |
| 2003/0002069 A1 | 1/2003 | Bhogal et al. | |
| 2003/0011812 A1 | 1/2003 | Sesek et al. | |
| 2003/0038964 A1 | 2/2003 | Ferlitsch | |
| 2003/0048472 A1 | 3/2003 | Perdu et al. | |
| 2003/0184782 A1 | 10/2003 | Perkins et al. | |
| 2004/0042042 A1 * | 3/2004 | Utsunomiya | 358/1.15 |
| 2004/0105122 A1 * | 6/2004 | Schaeffer | 358/1.15 |
| 2006/0033958 A1 | 2/2006 | d'Entrecasteaux | |
| 2006/0155825 A1 * | 7/2006 | Torii | 709/217 |

FOREIGN PATENT DOCUMENTS

| | | |
|---|---|---|
| JP | 64-014043 | 1/1989 |
| JP | 03282727 | 12/1991 |
| JP | 04-199218 | 7/1992 |
| JP | 04217550 | 8/1992 |
| JP | 05-270064 | 10/1993 |
| JP | 06-004239 | 1/1994 |
| JP | 07219731 | 8/1995 |
| JP | 08-101754 | 4/1996 |
| JP | 09-030040 | 2/1997 |
| JP | 09222964 | 8/1997 |
| JP | 09-319530 | 12/1997 |
| JP | 10-027149 | 1/1998 |
| JP | 10027076 | 1/1998 |
| JP | 10-031750 | 2/1998 |
| JP | 10154049 | 6/1998 |
| JP | 10-187393 | 7/1998 |
| JP | 10-207643 | 8/1998 |
| JP | 10240477 | 9/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11110143 | 4/1999 |
| JP | 11-143661 | 5/1999 |
| JP | 11219265 | 8/1999 |
| JP | 11296333 | 10/1999 |
| JP | 2000003258 | 1/2000 |
| JP | 2000-099303 | 4/2000 |
| JP | 2000-132347 | 5/2000 |
| JP | 2000-151873 | 5/2000 |
| JP | 2001071590 | 3/2001 |
| JP | 2001-088405 | 4/2001 |
| WO | WO01/31432 | 5/2001 |

OTHER PUBLICATIONS

U.S. Appl. No. 09/681,208—Office Action dated Jan. 8, 2007.
U.S. Appl. No. 09/681,208—Office Action dated Jul. 28, 2006.
U.S. Appl. No. 09/681,208—Office Action dated Jan. 12, 2006.
U.S. Appl. No. 09/681,208—Office Action dated May 4, 2005.
U.S. Appl. No. 09/681,208—Office Action dated Oct. 22, 2004.
U.S. Appl. No. 09/681,416—Office Action dated Aug. 11, 2005.
U.S. Appl. No. 09/681,416—Office Action dated Nov. 16, 2004.
U.S. Appl. No. 09/681,409—Office Action dated Aug. 11, 2006.
U.S. Appl. No. 09/681,409—Office Action dated Jan. 25, 2006.
U.S. Appl. No. 09/681,409—Office Action dated Jul. 29, 2005.
U.S. Appl. No. 09/681,409—Office Action dated Nov. 17, 2004.
U.S. Appl. No. 10/404,789—Office Action dated May 21, 2008.

U.S. Appl. No. 10/404,789—Office Action dated Nov. 28, 2007.
U.S. Appl. No. 10/404,789—Office Action dated Jul. 11, 2007.
U.S. Appl. No. 10/404,789—Office Action dated Feb. 6, 2007.
U.S. Appl. No. 10/404,789—Office Action dated Aug. 23, 2006.
U.S. Appl. No. 10/404,789—Office Action dated Mar. 15, 2006.
U.S. Appl. No. 10/404,789—Office Action dated Jul. 27, 2005.
U.S. Appl. No. 10/003,800—Office Action dated Apr. 20, 2006.
U.S. Appl. No. 10/003,800—Office Action dated Dec. 13, 2005.
U.S. Appl. No. 10/003,800—Office Action dated Jun. 15, 2005.
U.S. Appl. No. 09/683,162—Office Action dated Apr. 16, 2008.
U.S. Appl. No. 09/683,162—Office Action dated Oct. 29, 2007.
U.S. Appl. No. 09/683,162—Office Action dated May 17, 2007.
U.S. Appl. No. 09/683,162—Office Action dated Nov. 27, 2006.
U.S. Appl. No. 09/683,162—Office Action dated Jan. 10, 2006.
U.S. Appl. No. 09/683,162—Office Action dated Jun. 22, 2005.
U.S. Appl. No. 09/984,928—Office Action dated Mar. 17, 2008.
U.S. Appl. No. 09/894,928—Office Action dated Sep. 11, 2007.
U.S. Appl. No. 09/894,928—Office Action dated Mar. 2, 2007.
U.S. Appl. No. 09/894,928—Office Action dated Sep. 7, 2006.
U.S. Appl. No. 09/894,928—Office Action dated Mar. 15, 2006.
U.S. Appl. No. 09/894,928—Office Action dated Sep. 8, 2005.
U.S. Appl. No. 10/396,201—Office Action dated Jan. 23, 2007.
U.S. Appl. No. 09/964,985—Office Action dated Jan. 4, 2008.
U.S. Appl. No. 09/964,985—Office Action dated Jul. 17, 2007.
U.S. Appl. No. 09/964,985—Office Action dated Jan. 25, 2007.
U.S. Appl. No. 09/964,985—Office Action dated Aug. 10, 2006.
U.S. Appl. No. 09/964,985—Office Action dated Mar. 13, 2006.
U.S. Appl. No. 09/964,985—Office Action dated Sep. 13, 2005.
U.S. Appl. No. 09/932,661—Office Action dated Jun. 8, 2007.
U.s. Appl. No. 09/932,661—Office Action dated Jun. 27, 2006.
U.S. Appl. No. 09/932,661—Office Action dated Nov. 28, 2005.
U.S. Appl. No. 09/932,661—Office Action dated May 4, 2005.
U.S. Appl. No. 10/002,781—Office Action dated Nov. 17, 2006.
U.S. Appl. No. 10/002,781—Office Action dated May 1, 2006.
U.S. Appl. No. 10/002,781—Office Action dated Nov. 28, 2005.
U.S. Appl. No. 10/002,781—Office Action dated Jun. 15, 2005.
U.S. Appl. No. 09/967,592—Office Action dated Jun. 12, 2008.
U.S. Appl. No. 09/967,592—Office Action dated Dec. 12, 2007.
U.S. Appl. No. 09/967,592—Office Action dated Jun. 27, 2007.
U.S. Appl. No. 09/967,592—Office Action dated Nov. 29, 2006.
U.S. Appl. No. 09/967,592—Office Action dated Jun. 15, 2006.
U.S. Appl. No. 09/967,592—Office Action dated Jan. 27, 2006.
U.S. Appl. No. 09/967,592—Office Action dated Aug. 10, 2005.
IBM AS/40 Printing V, Oct. 2000, http://www.redbooks.ibm.com/redbooks/pdfs/sg242160.pdf.
PostScript Language Document Structuring Conventions Specification, Version 3.0, Adobe Systems Incorporated, 1992.

* cited by examiner

METHODS AND SYSTEMS FOR PRINT SYSTEM COMPONENT-BASED REMOTE PRINTING

CROSS REFERENCE TO RELATED APPLICATIONS

This application claims the benefit of Provisional Application Ser. No. 60/261,132, entitled "Methods and Systems for Print-Processor Modified Printing" filed Jan. 11, 2001 by inventors Ferlitsch et al; this application also claims the benefit of U.S. patent application Ser. No. 09/681,208, entitled "Methods and Systems for Print-Processor Modified Printing" filed Feb. 22, 2001 by inventors Ferlitsch et al; this application also claims the benefit of U.S. patent application Ser. No. 09/681,409, entitled "Methods and Systems for Print-Processor-Based Printer Status Detection and Print Task Distribution" filed Mar. 30, 2001 by inventors Ferlitsch et al; this application further claims the benefit of U.S. patent application Ser. No. 09/894,928, entitled "Methods and Systems for Page-independent Spool File Sheet Assembly" filed Jun. 28, 2001 by inventor Ferlitsch; this application further claims the benefit of U.S. patent application Ser. No. 09/681,416, entitled "Methods and Systems for Print-Processor-Based Print Task Error Recovery" filed Mar. 30, 2001 by inventors Ferlitsch et al.

BACKGROUND OF INVENTION

Many offices can generate a high volume of printer output or require high print rates to meet deadlines. When these needs are fairly constant, large, high-production printers and associated hardware may be required. These high-production units are expensive to procure and maintain and, generally, are only made economically feasible by a constant high demand for printer output. When printer requirements fluctuate, the costs of these high-production printers are difficult to justify. However, when sporadic, high printer throughput is a necessity, some offices are forced to bear the costs of expensive printer equipment that runs at well below its capacity most of the time.

Cluster printing has been introduced to avoid this problem. Cluster printing involves the use of multiple printers in a network. With cluster printing, print jobs can be sent to a multiple printer network with a capacity that rivals the capacity of expensive, high-throughput equipment. Generally, this network is comprised of multiple lower-production printers that may already exist in an office environment making the cost of the network very manageable.

Through the use of cluster printing, a user may choose to split a single print job among several printers to increase print job speed and decrease print time. Print jobs that include multiple copies may be divided so that each printer in a network prints some of the copies. Other variations of print job distribution may also be implemented, such as color/black-and-white separation.

Cluster printing may be implemented through specialized printers that contain cluster-enabling firmware. When these printers are interconnected via cables, they can share printing jobs. In some cases, the marking engines are connected to enable division of printing tasks between the connected printers.

Other methods of implementing cluster printing functions require the use of additional hardware. Typically, a specialized print server is used. This server is generally a high-performance general purpose computer to which print jobs are directed by the network. Specialized software on the server allows print jobs or copies thereof to be distributed among multiple printers that are managed by the server.

These known cluster printing implementations require specialized printer or server hardware or software to provide cluster printing functions.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows 95® and related Microsoft Windows® printing processes will be explained.

Microsoft Windows® operating systems typically employ two file types in the printing process. These file types are Enhanced Metafile (EMF) and raw format (raw) files.

Raw format files are device dependent files that are destined and formatted for a specific device. An example of a raw file is an encapsulated Postscript file, which is formatted to be interpreted by a Postscript printer. EMF files are device independent files that contain graphic device interface (GDI) function calls that reproduce an application's graphic objects on a printer. EMF files are used to quickly record a printed document and return system control to a user. After control is returned to the user, the function calls stored in the EMF file may be executed and sent to the printer in the background.

Files may be recorded for later play back by using a spool file that is written and later de-spooled to a printing device. Spool files may be used for EMF and raw files. However, a print job may also be written directly to a printing device without using a spool file. Some typical printing process scenarios using raw spool files and EMF spool files are described in the related references listed above. A more thorough understanding of these systems and methods may be had through reference to these related applications and through reference to the Microsoft Windows 95® Driver Development Kit (DDK) documentation, the Microsoft Windows 2000® DDK documentation, the Microsoft Windows NT® DDK documentation and the Microsoft Windows XP® DDK documentation, incorporated herein by reference.

SUMMARY OF INVENTION

Embodiments of the present invention comprise methods and systems that enable a user to distribute print tasks to one or more remote printing devices. These methods and systems can be implemented without the use of additional hardware or server application software for this purpose. These systems and methods are typically used in conjunction with a computer network comprising at least one computing device that is remote to a second computing device that is connected locally to one or more printing devices. Printing tasks which are typically sent to a single printing device may be distributed to alternative printing device(s) or multiple printing devices in cluster printing embodiments.

BRIEF DESCRIPTION OF DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
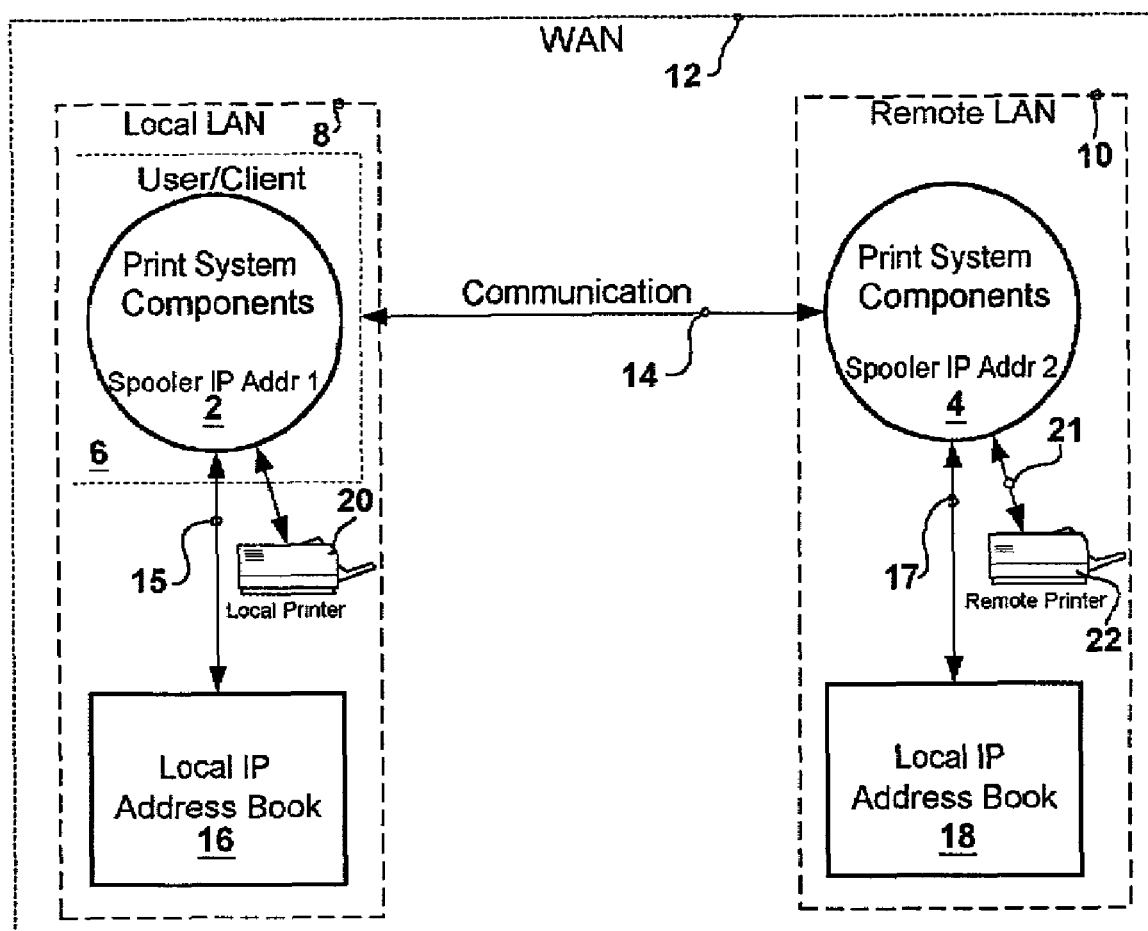
FIG. 1a is a diagram depicting embodiments of the present invention comprising one or more IP address books.

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in these figures is not intended to limit the scope of the invention, as claimed, but is merely representative of embodiments of the invention. Some embodiments of the present invention will be best understood by reference to the drawings, wherein like parts are designated by like numerals throughout.

To simplify discussion of a printing system some groups of system components may be referred to collectively. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor. Equivalent component groups may be referred to by these terms also whether in a Microsoft operating system or another system.

The systems and methods of embodiments of the present invention typically operate within a system comprising one or more printers connected together in a common network environment (locally connected, remotely connected through network print queue or combinations thereof) with a computing device capable of spooling a print job and one or more computing devices remote to the network of printers and their connected computing device. These systems and methods may also comprise a printer driver and print processor compatible with the printing devices, such as in the Microsoft Windows 9x, NT, 2000, XP and other operating systems.

Embodiments of the present invention which utilize a Microsoft Windows operating system generally comprise a printer driver, spooler, print processor and other print system components which process print tasks generated through the operating system and applications running on the operating system. Embodiments used in conjunction with other operating systems will typically utilize similar processing elements which may be referred to as print system components.

Exemplary embodiments of the present invention will be described with terminology related to a Microsoft Windows® environment, however these terms shall relate to equivalent elements in other operating systems. For example, the print processor described in many embodiments will relate to a print processor common in the Windows® environment as well as elements with equivalent functions in other operating systems.

The definitions in this and subsequent paragraphs apply throughout this specification and related claims. The term "printjob" may refer to any combination of data that can be printed. A print job may comprise text and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "print copy" or "copy" may refer to data, code or commands which generate a single printing device output of a print job or may refer to the actual hard copy output of the print job.

The term "print task" may comprise any combination of print jobs and copies thereof. A print task may comprise one or more print jobs and one or more copies of each print job.

The term "copy splitting" may refer to a process by which a print task comprising multiple copies is divided into multiple modified print tasks with each modified print task comprising a portion of the total number of copies.

The term "job splitting" may refer to a process by which a print task comprising at least one print job is split into multiple modified print tasks with each modified print task comprising a portion of a print job.

The term "network" may refer to any combination of computing devices and peripherals, such as printing devices, wherein communication between devices is enabled. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods References to a Microsoft Windows or Windows operating system may refer to any version or variation of a Microsoft Windows operating system comprising Windows 95, Windows 98, Windows NT, Windows 2000, Windows ME, Windows XP and others. While exemplary embodiments of the present invention may be directed to a Windows operating system and environment, systems and methods directed to other operating systems such as Macintosh, UNIX, DOS, Linux, MVS and other systems for mainframe computers, minicomputers, microcomputers, palm computing devices and other computing devices are to be contemplated within the scope of the present invention.

Embodiments of the present invention may be embodied in software, firmware, hardware and other forms that achieve the function described herein. As embodiments of the present invention may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light signals in a fiber-optic or other transmission line. All of these embodiments are to be considered within the scope of the present invention.

Embodiments of the present invention may be used to achieve printing device status detection and analysis, print task modification, copy splitting, job splitting, error detection, error correction, capability matching, print task redirection, print task redistribution and various combinations of these concepts along with related distribution tasks that allow modified or unmodified print tasks to be distributed to one or more printing devices. In some embodiments, printer status and printer capabilities are detected and analyzed to determine a print task destination or modified print task destination. In other embodiments, printer status and printer capabilities may be used to modify a print task to print on a specific printer.

The systems and methods of embodiments of the present invention may comprise a plurality of printing devices, which are connected locally to a local computing device, which is also connected to one or more remote computing devices. These printing devices will typically be connected over a network such as a Local Area Network (LAN) to a local computing device, but may be otherwise connected to the local computing device. In some embodiments, including embodiments employing versions of the Microsoft Windows operating system, such as Windows 9x, NT, 2000, XP and others, these systems may also comprise a printer driver, print processor and other print system components compatible with the system and printing devices.

During use of embodiments, a user will typically initiate a print task comprising one or more print jobs. A print task may comprise multiple copies of a print job and/or one or more distinct print jobs. These print jobs may be generated from a single application or from various applications. Print jobs may also be generated from the operating system or imported from other sources. Print jobs and tasks may be preprocessed into printer-ready data. For example, an application may render its output into a Page Description Language (PDL) such as PCL, Postscript, PDF, TIFF or others. A print job may also be journalled wherein rendering instructions are recorded for deferred playback. Journalled formats comprise Microsoft's Enhanced Meta File (EMF) and Sharp's Printer Meta File (PMF).

Generally, a user will provide some form of input signal to communicate an intention to spool a print job or task. In some embodiments, the system will respond to this input by prompting for print options. This may be done through the use of a dialog box, a user interface, command line query or some other prompt. One option that may be presented to a user is the selection of one or more printing devices, such as printers, plotters, Multi-Function Peripherals (MFPs), CD writers or other devices that create human-readable or machine-readable media. Once the printing device or output device(s) is selected, a system may respond by loading a device driver and, in some embodiments a print processor associated with the output device.

A device driver will typically respond to the user input received from the prompt and prompt again for device specific information. In typical print system embodiments, a user may be prompted for selections related to device capabilities such as print quality, paper size, orientation, tray selection, manual feed, stapling, watermarks and many other options. In embodiments of the present invention comprising cluster printing capabilities, a user may be prompted to select options related to printing on a remote printer cluster or other output device cluster. In other embodiments, cluster printing or cluster output options may be determined automatically with limited user input or without related user interaction.

When output device options have been selected, either by the user or by automated function, the system may begin the printing or output process. In some exemplary embodiments, this process will comprise compilation of job specific information, such as DEVMODE data in some Microsoft Windows operating systems. This process may further comprise compilation of rendering instructions and rendering of the print task or job for printer-ready data or recording of the print task of job for journalled data. In some embodiments, under certain conditions, a print job or task may already be, totally or partially, rendered into printer-ready data and the act of compiling rendering instructions may be skipped partially or entirely.

Output from a device driver such as a print driver, for spooled print jobs or tasks, may be referred to as a spool file and the contents of the spool file may be referred to as spool data. A spool file may be recorded on disk, in memory, in cache or any other form of storage compatible with a computing device.

Once spool data is compiled in an accessible format, a print processor may access spool data. A print processor or similar print system component may read the spool data and determine if the content is printer-ready data, such as RAW mode data in a Microsoft Windows operating system, or journalled data, such as EMF data in a Microsoft Windows operating system.

When the spool data format is printer-ready data, the spool data may be sent directly to a port manager or similar print system component associated with the selected output device such as a printer. If the spool data format is journaled, the spool data is played back to the printer driver, which, in conjunction with a Graphics Device Interface (GDI), converts the data to printer-ready data. This printer-ready data is then sent back to a spooler which directs the data to a port manager or similar component for forwarding to the destination device.

In an operating system or printing environment that supports only one data format, such as printer-ready data, a conventional print processor would not be required and a spooler may write data directly to a port manager associated with the selected output device(s). Some Microsoft Windows operating systems allow bypassing the print processor and despooling printer-ready data directly to the printer or output device.

In embodiments of the present invention, remote printers and output devices that are not accessible locally may be selected and print jobs and tasks may be despooled to these remote devices.

Figure 1B:
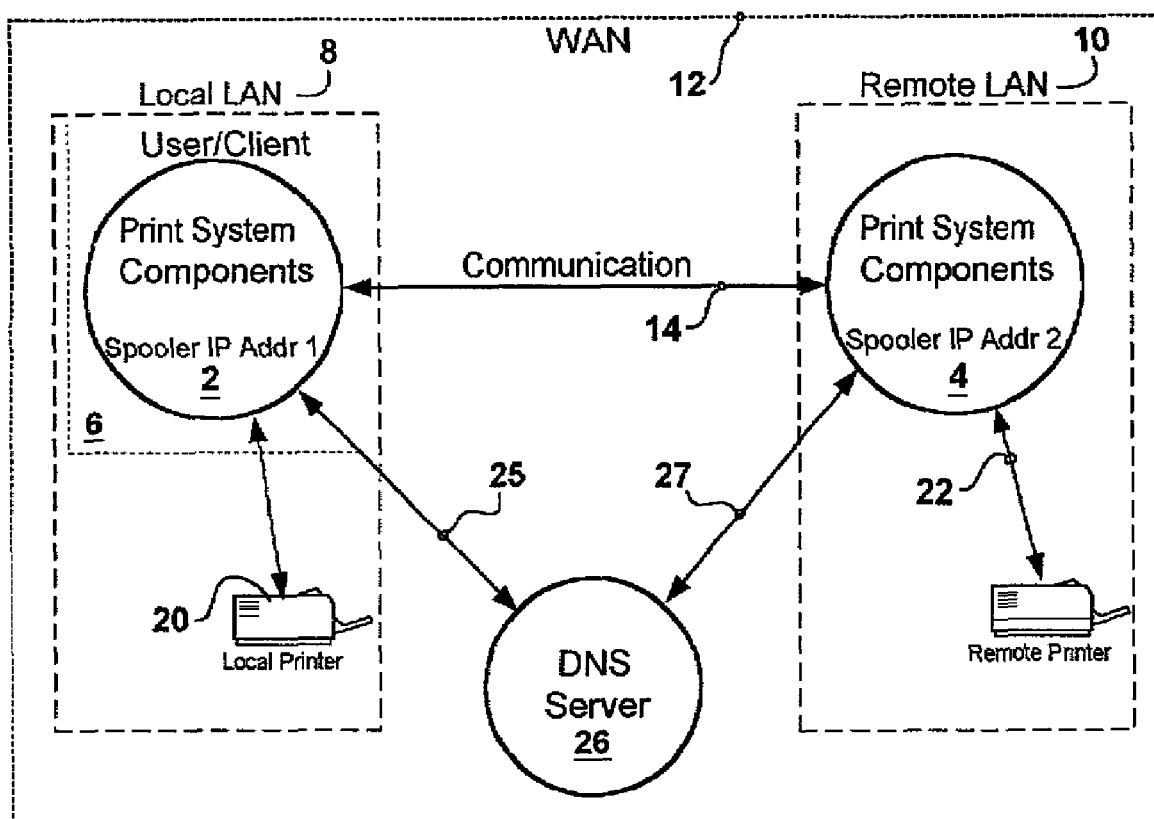
FIG. 1b is a diagram depicting embodiments of the present invention comprising one or more DNS servers.
Figure 1C:
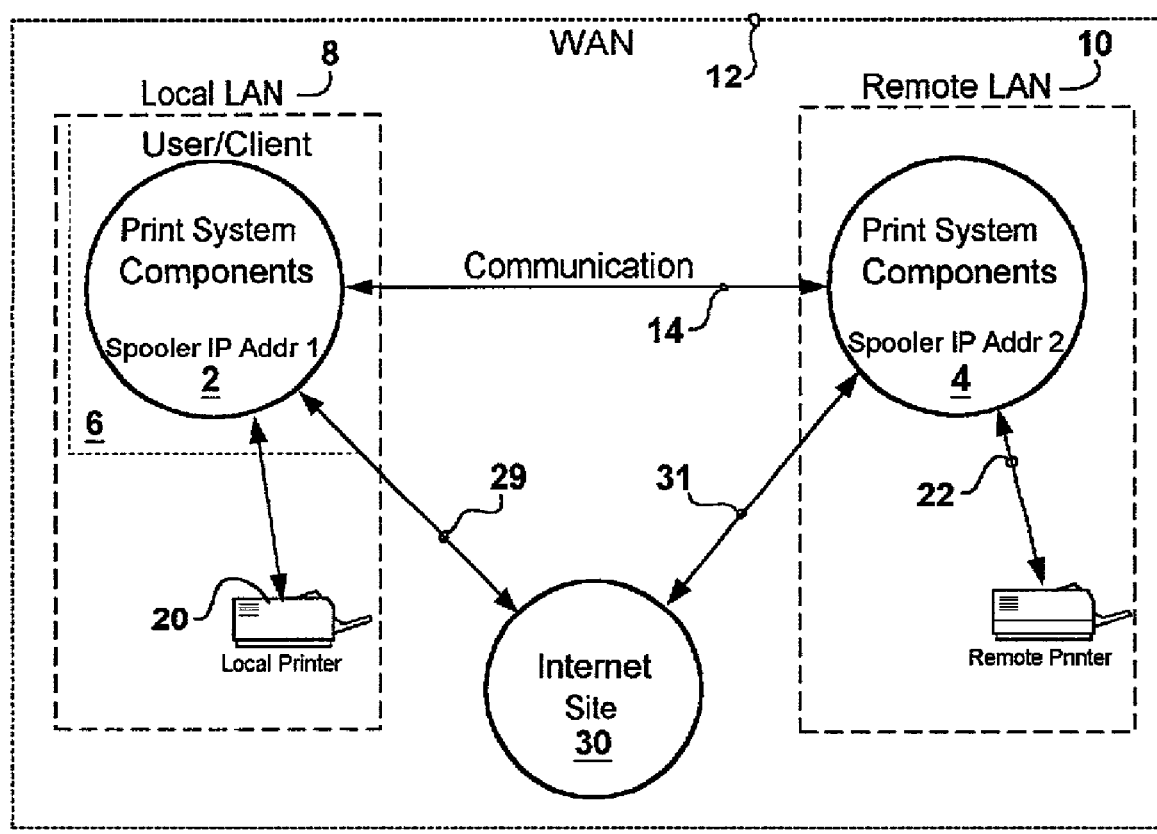
FIG. 1c is a diagram depicting embodiments of the present invention comprising one or more Internet sites.

Spooler-Based Selection of Remote PrintersEmbodiments of the present invention may comprise one or more print system components 2,4 that enable the system to connect to local devices 20, such as those connected on a user's Local Area Network (LAN) 8, and remote devices 22, such as those connected over a Wide Area Network (WAN) 12 as illustrated in FIGS. 1*a* through 1*c*. These print system components 2,4 may comprise a spooler, a print processor, a driver or other components, however, particular embodiments described in this section comprise a spooler. Communication 14 between these print system components 2,4 may be made through connection or comunication protocols such as TCP/IP and IPP as well as other protocols and methods.

In these embodiments, a spooler 2 may identify the location and connection mechanism to another print system component 4, such as a spooler or print processor, in a wide area network (WAN) 12 through a variety of methods. As a non-limiting example, shown in FIG. 1a, a local address book 16 that contains a listing of remote spoolers, print processors or other print system components and their corresponding Internet Protocol (IP) addresses may be used. This address book 16 may be located on the user's LAN 8 where it may be accessed directly by a local print system component 2. In other embodiments, the address book 18 may be located on a remote LAN 10 accessible to the user 6 across a WAN 12. In these embodiments, the address book 18 may be accessed by a remote print system component 4, which may then transfer data 14 to a print system component 2 local to the user 6. In other embodiments, an address book 18 remote to a user 6 may be addressed directly 24 by a print system component local to a user 6.

As another non-limiting example, shown in FIG. 1b, a Domain Name Server (DNS) 26, which resolves the remote print system component 4 (i.e., spooler) name into an IP address may be used. In some of these embodiments a user 6 may initiate a print procedure, which prompts print system component 2 to contact 25 a DNS server 26 to determine the location of a remote print system component 4 to which a print job may be sent. A DNS server 26 may also communicate 27 with a remote print system component 4 to determine capabilities, availability or other attributes and communicate that information back to the local print system component 2. In some embodiments, a local print system component 2 may determine print task requirements and query DNS server 26 for the address of a remote printer 22 which is capable of handling the requirements of the print task. DNS server 26 may then query the devices and components on its remote LAN10 or other network and determine which devices have the capability and availability to handle the print task. The address or addresses of those devices or associated print system components 4 may then be communicated 25 back to the print system component 2 local to the user 6.

As a further non-limiting example, shown in FIG. 1c, a domain site 30, on the Internet, that contains a database or similar record that correlates spooler or other print system components with IP addresses or Internet domain names may be used. A print system component, such as the spooler 2 of these exemplary embodiments, may then use this information to establish a connection 14 and communicate bidirectionally with the remote print system component 4 such as a spooler or print processor. As discussed for previous embodiments, a local print system component 2 may determine print task requirements or other criteria and communicate these requirements to an Internet site 30 which may then query sites available to it and determine which devices are capable of executing the task. Internet site 30 may then determine the IP addresses or other identifiers of these devices or their associated print system components and communicate 29 the addresses or identifiers back to the local print system component 2 to enable it to contact and communicate 14 with the remote print system components 4 and/or associated devices 22.

Figure 2:
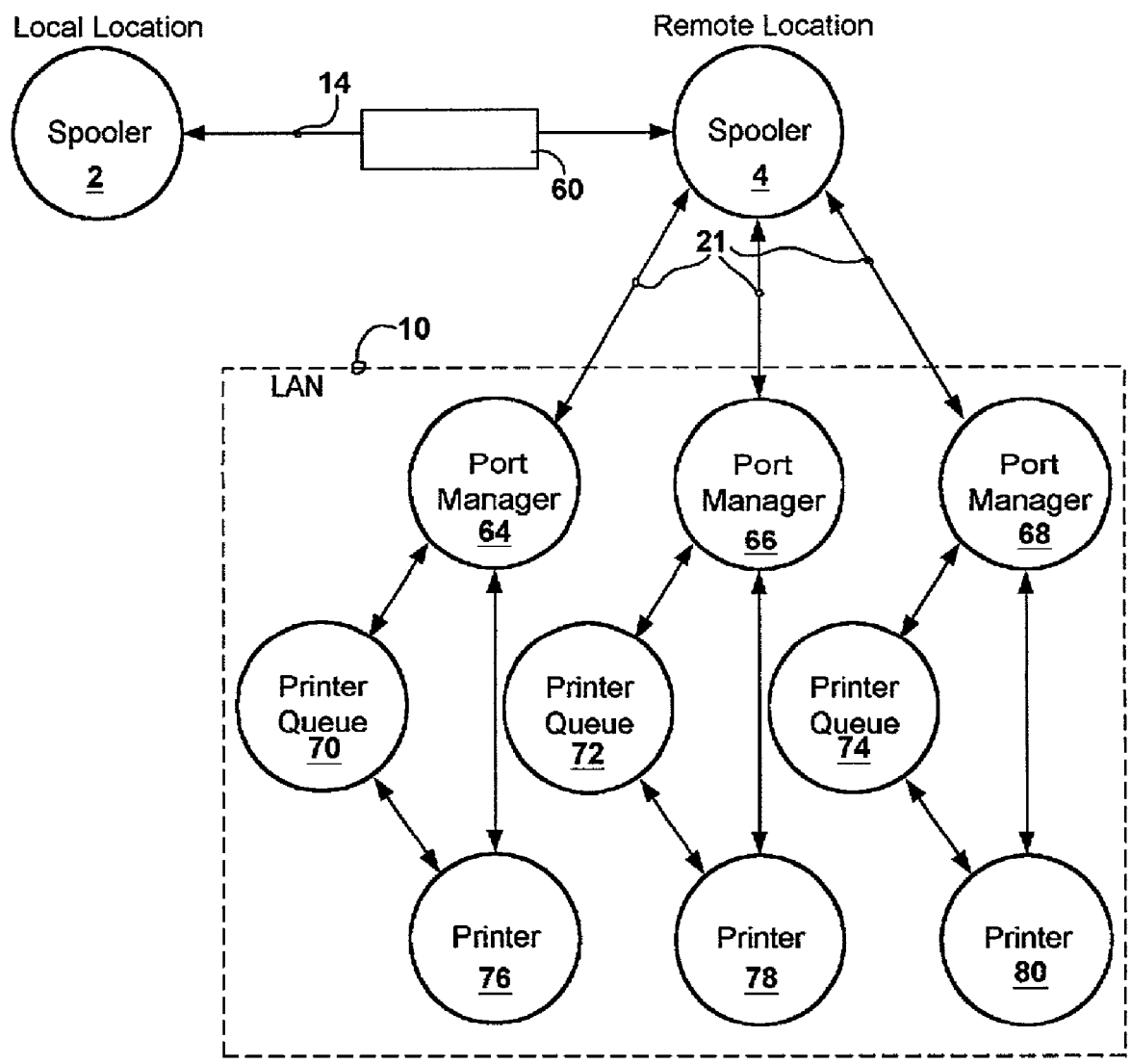
FIG. 2 is a diagram depicting an exemplary spooler-based embodiment checking availability, accessability and/or capabilities of devices.

Once a local print system component 2, such as a spooler, establishes a connection 14 for bi-directional communication with a remote print system component 4, the local print system component 2 may send a query request 60 to the remote print system component 4 as illustrated in FIG. 2. The remote print system component 4 may then communicate 21 over its own local network 10 (i.e., LAN) with devices 22, 70, 72, 74, 76, 78, 80 that are local to it through port managers 64, 66, 68 or by other means and determine the availability, accessibility and capabilities of devices 22 in communication with the remote print system component 4.

Communication 21 between a remote print system component 4 and devices 22, 70, 72, 74, 76, 78, 80 in communication with it may comprise a broadcast message over a LAN wherein the message prompts the devices 22, 70, 72, 74, 76, 78, 80 or their associated port managers 64, 66, 68 to identify themselves and communicate their accessibility and capabilities. This communication 21 may also comprise pinging a known device to determine availability. Communication 21 between a remote print system 4 component and devices 22, 70, 72, 74, 76, 78, 80 in communication with it may further comprise bi-directional communication to determine availability and capabilities. Simple Network Management Protocol (SNMP) and Internet Printing Protocol (IPP) may also be used, in some embodiments, to communicate 21 between a remote print system component 4 and devices 22, 70, 72, 74, 76, 78, 80 in communication with it. This communication 21 may also be achieved through Application Program Interface (API) calls to network queues or devices to determine availability and capabilities.

For determining accessibility, a print system component 2,4 may prompt for and receive a device's name, location and model type as well as other information. For determining availability, a print system component 2,4 may prompt for and receive a device's status, such as idle (cool), ready to print (warm), busy, estimated time to availability, error states and other information. For determining device capabilities, a print system component 2,4 may prompt for and receive a printer's Page Description Language (PDL) interpreters, duplexing, input trays, paper sizes, output trays, collation, stapling, 3-hole punch, print speed (PPM) or other information.

Once a remote print system component 4, such as a spooler, receives this device information, some or all of the information or data derived from the information may be sent back to the local print system component 2 that requested the information. A remote print system component 4 may employ an algorithm to filter printers or other devices from a set. As a non-limiting example, a secured access or capacity preservation algorithm may be used.

Figure 3:
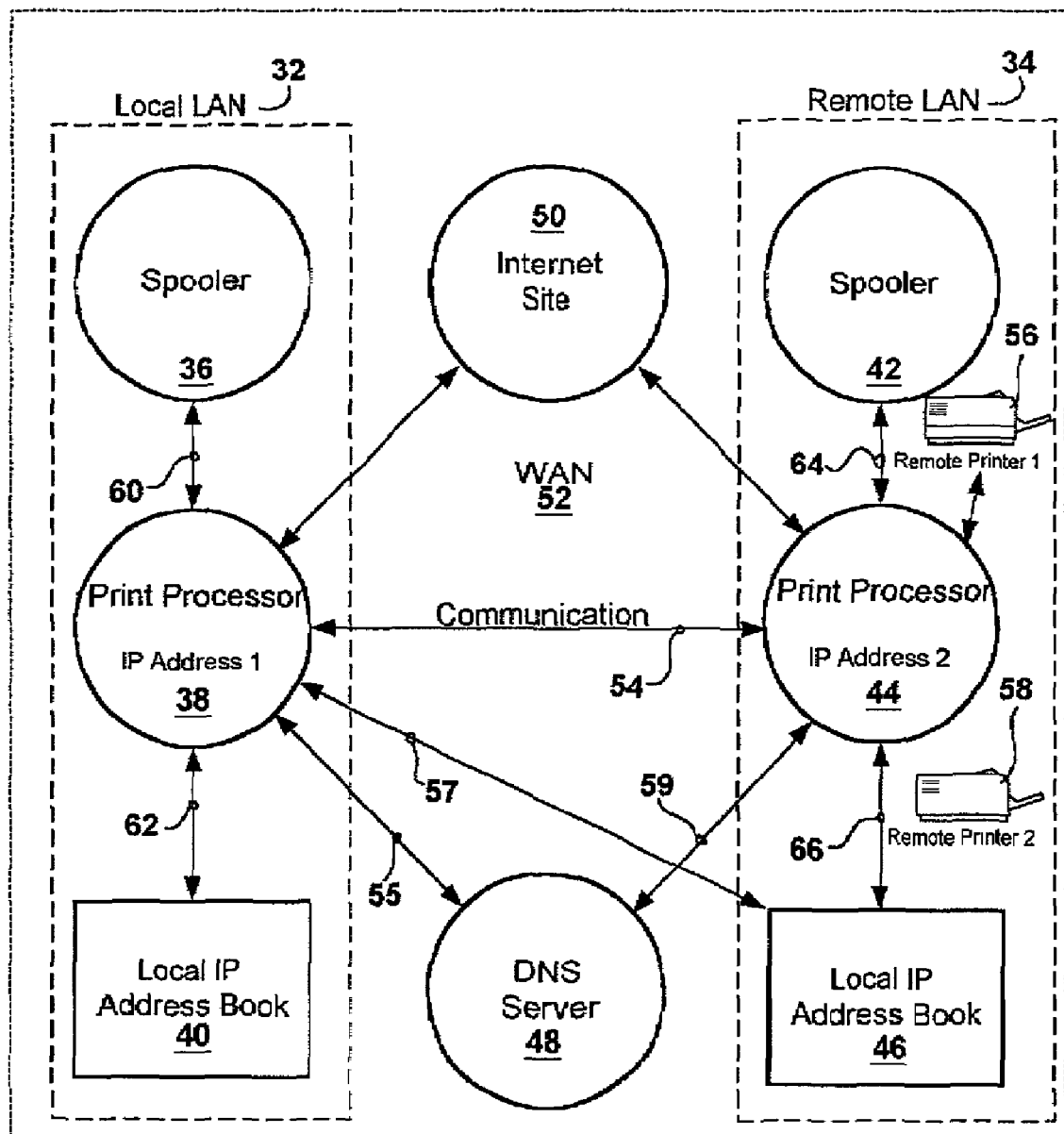
FIG. 3 is a diagram depicting multiple, alternative print processor-based embodiments.

Print Processor-Based Selection of Remote Devicesin some embodiments of the present invention as shown in FIG. 3, a print processor is capable of connecting to a network to communicate both in a local area network (LAN) 32 and a wide area network (WAN) 52. This may be achieved using TCP/IP, IPP and other protocols and methods. In these embodiments, a print system component such as a print processor 38 is able to identify the location and connection mechanism to another print system component such as another print processor 44 or spooler 42 in a WAN 52 through a variety of methods.

In some embodiments, an address book 40 that contains a listing of remote print system components such as spoolers 42 and print processors 44 and their corresponding IP addresses. In some of these embodiments, the address book 40 is a local address book 40, which is accessible to a print system component 36, 38 that is local to it. In other embodiments, a print system component 36, 38 may establish communication 54 with a known remote print system component 44 that, in turn, accesses a remote address book 46. In still other address book embodiments a local print system component 36, 38 may have a list of remote address books, which it can access directly 57 to determine remote device 56,58 characteristics and locations.

In other print processor-based embodiments, a DNS server 48, which resolves the remote print system components 42, 44 and their corresponding IP addresses. In some of these embodiments, a local print system component, such as a print processor 38, may communicate 55 with a DNS server 48 to access records that may comprise device IP addresses, device characteristics, device availability or other information. In other embodiments, a local print system component, such as a print processor 38, may communicate 55 with a DNS server 48 to query for device IP addresses, device characteristics, device availability or other information for devices that meet certain established criteria such as print task requirements. In still further embodiments, a local print system component, such as a print processor 38, may communicate 55 with a DNS server 48 to communicate print task requirements. DNS server 48 may then query 59 devices or print system components associated with devices on its network 34 to determine which devices are capable of executing the print task. When appropriate devices are determined, the addresses of those device's print system components may be returned to the local print system component 38 so that the print task may be sent to those devices.

Other embodiments of the present invention, shown in FIG. 3, may comprise a network database of Internet site 50, which comprises a database of print system components, such as print processors 44 and spoolers 42 that can be accessed through the WAN 52. A database at site 50 may comprise device IP addresses, other location data, device capability data, device availability data or other device characteristics. A database at site 50 may be queried for device data to determine a device's suitability for a particular task. Task requirements may also be communicated to a site 50, which may then poll or otherwise communicate with devices on the WAN 52 to determine their characteristics and availability. The result of this query may then be reduced to a list of suitable devices for which an address is passed back to the local print system component 38 to identify the location of suitable devices for the task. The local print system component 38 may then establish bi-directional communication with these devices and send the task to these devices for execution or choose from among the devices and send the task to some subset of the devices.

Figure 4:
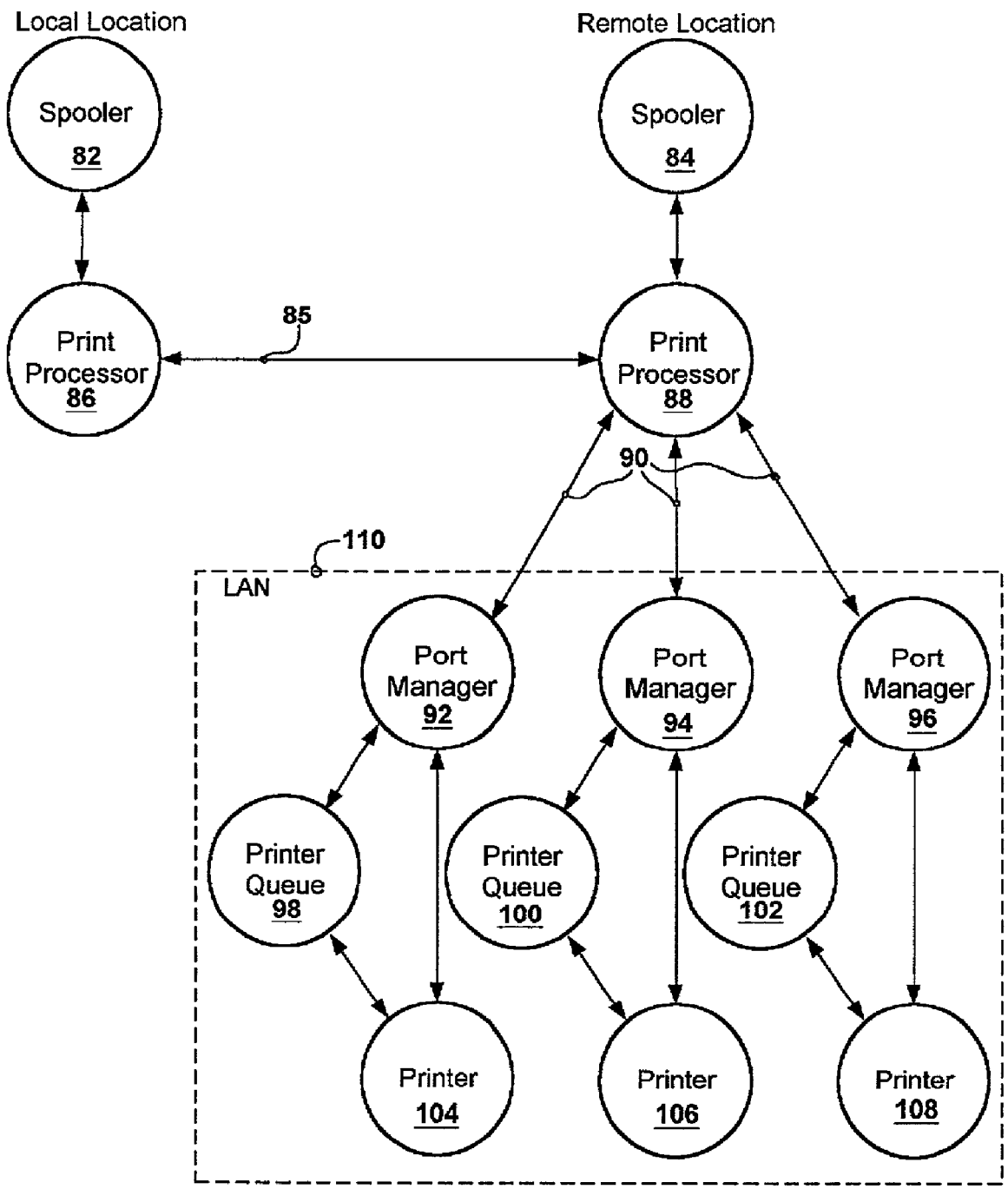
FIG. 4 is a diagram depicting an exemplary print processor-based embodiment checking availability, accessability and/or capabilities of devices.

In some embodiments of the present invention as illustrated in FIG. 4, once a local print system component, such as a local print processor 86, establishes a connection for bi-directional communication 85 with a remote print system component, such as remote print processor 88, a local print processor 86 may send a query request to a remote print processor 88 or other print system component (i.e., spooler 84). The remote print system component 88 may then communicate 90 over its LAN to identify the availability, accessibility and capabilities of devices 98, 100, 102, 104, 106, 108 in the LAN 110. These devices 98, 100, 102, 104, 106, 108 may be connected locally, by network or remotely. Communication 90 may comprise a broadcast message over the LAN for devices to respond and identify themselves.

Communication 90 may also comprise pinging known devices, bidirectional communication to local devices, SNMP or IPP queries, API calls to network queues and local devices or other methods.

To determine accessibility parameters, a device's name, location, connection address, connection method, and model type are examples of information that might be returned. For determining availability, a device's status such as idle(cool), ready to print (warm), busy, estimated time to availability and error states are examples of information that might be returned. For determining capabilities, a device's PDL interpreters, duplexing capability, input tray data, paper size data, output tray data, collation capability, stapling capability, hole punching capability, sheet assembly, memory, storage space, print speed (PPM) and other data may be returned.

A remote print system component, such as print processor 88, may return this information or a subset thereof back to the local print system component 86. When only a subset of the data is returned, the remote print system component 88 may employ an algorithm to filter devices from consideration by the querying print system component. Examples of these algorithms comprise secured access and capacity preservation.

Spooler Despooling to a Remote Location RAW mode printing once a user has selected one or more devices (i.e., printers) through a local print system component, such as a spooler, the local print system component may send a message to a remote print system component declaring an intent to despool a print task to one or more printers in communication with the remote print system component.

Figure 5:
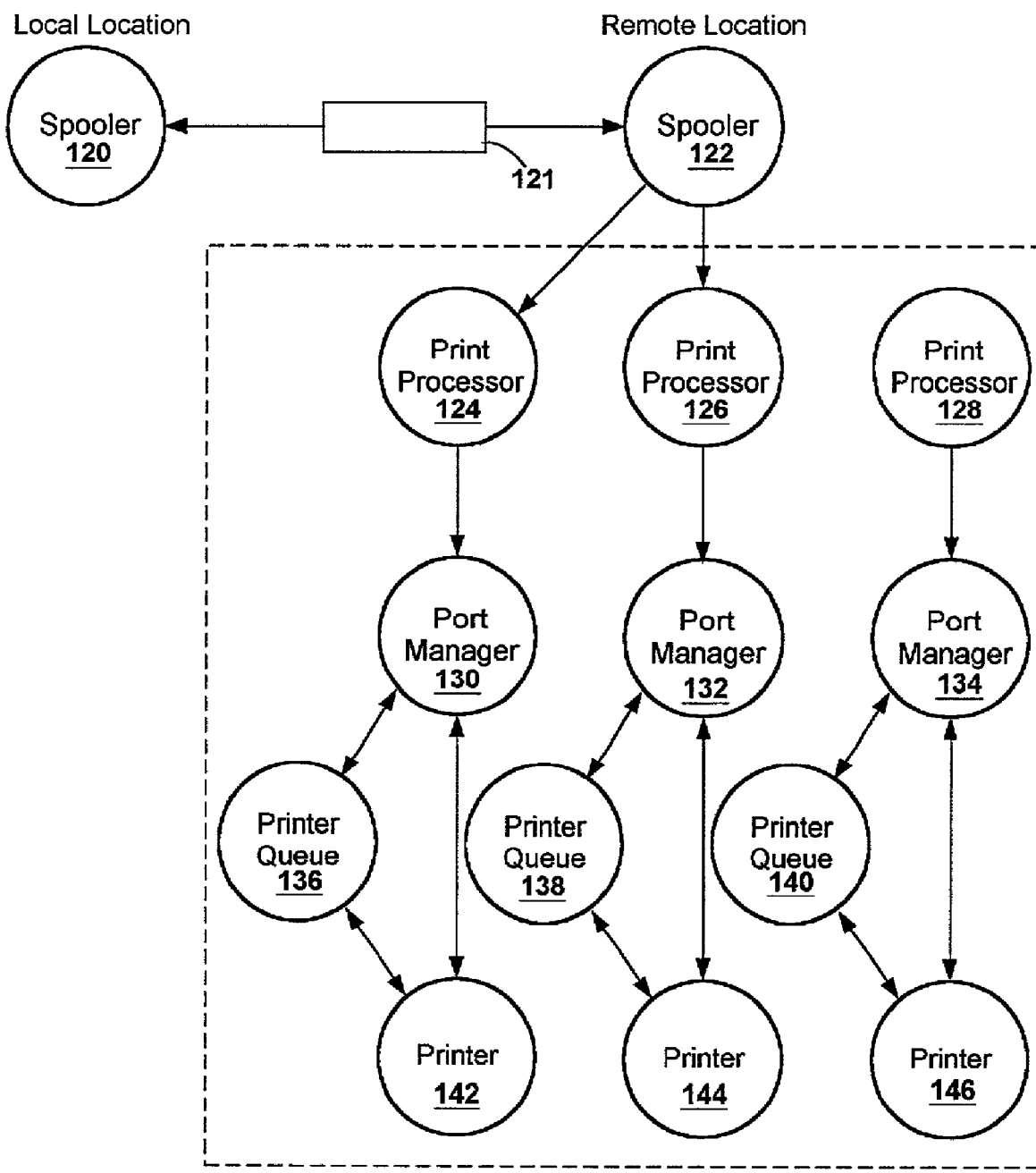
FIG. 5 is a diagram depicting an exemplary spooler-based embodiment despooling printer-ready files to remote devices.

In the exemplary embodiment illustrated in FIG. 5, a local spooler 120 sends a message 121 to a remote spooler 122. Message 121 may comprise print task data which identifies the destination devices and the characteristics of the print task. Message 121 may comprise cluster printing data including job splitting and copy splitting data as well color/B&W separation and alternate or backup printers.

As a non-limiting example, local spooler 120 may establish bi-directional communication with remote spooler 122 wherein spooler 120 queries for printers that have the capability to handle a specific print task. Remote spooler 122 may respond by finding querying its local devices and finding three printers 142, 144, 146 that are capable of printing the print task. Remote spooler 122 may then respond to local spooler 120 by identifying the printers 142, 144, 146 and their capabilities. Remote spooler 120 may then configure the print task for the printers 142, 144, 146 by splitting the print task among the printers 142, 144, 146. This configuration may comprise copy splitting, job splitting, color/B&W separation or any other print task configuration. Alternatively, local spooler 120 may send instructions to remote spooler 122 and remote spooler 122 may configure a print task for printing on one or more printers and distribute the print task to the correct printers.

Once a print task is configured for the proper printers 142, 144, 146, remote spooler 122 may despool the task to the print processors 124, 126, 128 associated with the destination devices. In RAW mode printing, print processors 124, 126, 128 may then forward the RAW mode, printer-ready data to port managers 130, 132, 134 which may then send the print data directly to printers 142, 144, 146 or, when print servers are used, may send the print data to the print queues 136, 138, 140 associated with the destination printers.

In various embodiments of the present invention, a print task may be divided by copy splitting, job splitting, color/B&W or other methods and distributed to multiple destinations. This print task may be divided by a local print system component such as local spooler 120 which can then be sent to remote spooler 122 as multiple print data streams. A print task may also be sent from local spooler 120 to remote spooler 122 as a single print task which is then divided or reconfigured for one or more devices and sent to the print processors 124, 126, 128 associated with the destination devices. In other embodiments, a print task may be sent from local spooler 120 to remote spooler 122 and forwarded to another print system component such as a print processor, which then divides or reconfigures the print task and sends one or more print data streams to the designated destinations.

Figure 6:
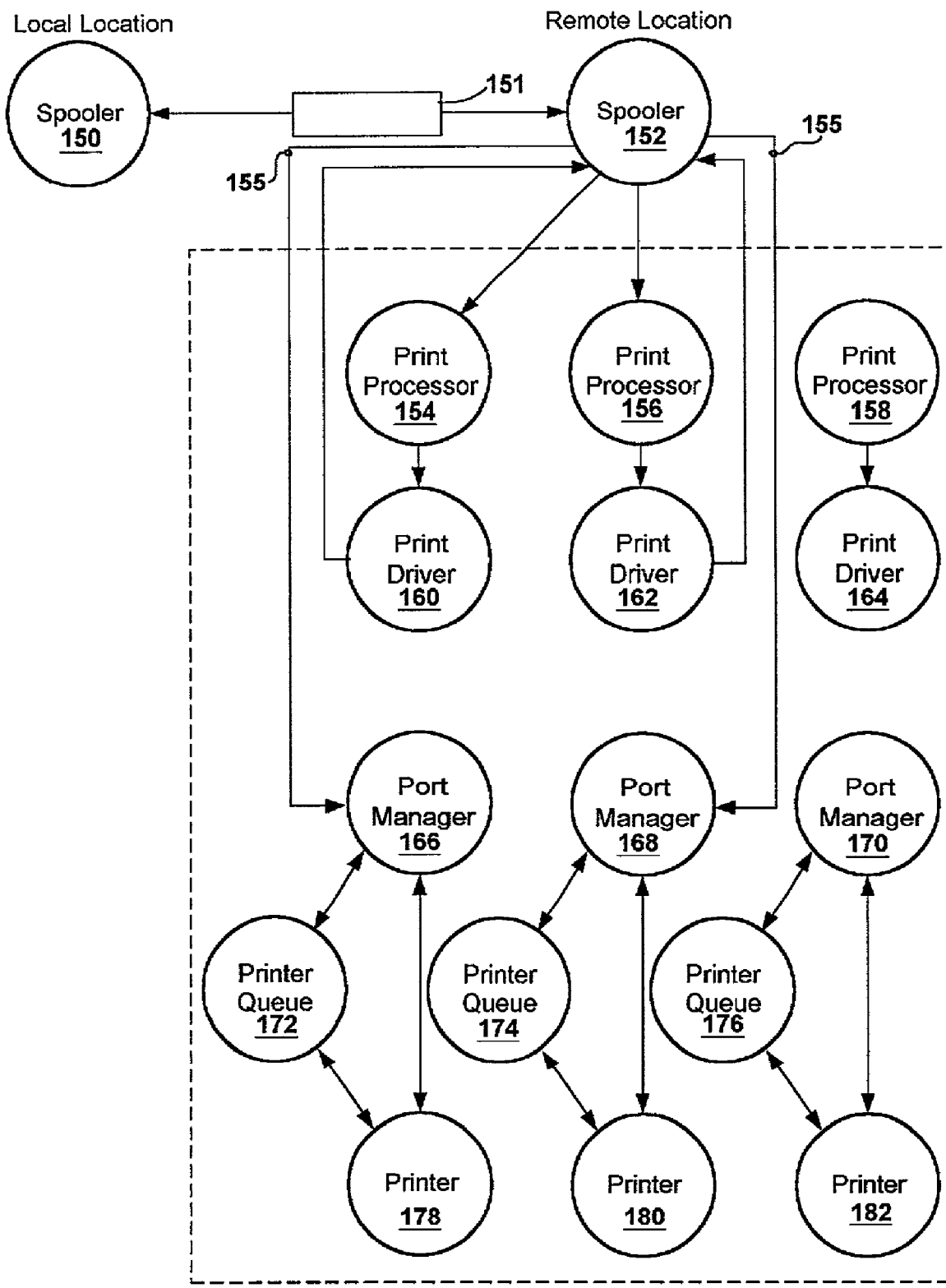
FIG. 6 is a diagram depicting an exemplary spooler-based embodiment despooling journaled files to remote devices.

Spooler Despooling to a Remote Location EMF mode printing some embodiments of the present invention, illustrated in FIG. 6, employ journaled print data such as EMF mode data. In these embodiments, journaled data 151 may be despooled to a remote spooler 152, which invokes one or more print processors 154, 156, 158. Print processors 154, 156, 158 may then play back the journaled (i.e., EMF) data to the drivers 160, 162, GDIs and/or other components required to process the journaled data into printer-ready data. This printer-ready data is then sent back to the spooler 152 for despooling 155 to the port managers 166, 168 associated with the destination devices 178, 180. Port managers 166,168 may send data directly to printers 178, 180 or may use one or more print queues 172, 174, which send print data to printers 178, 180.

As in other embodiments described above, a print task may be divided by copy splitting, job splitting, color/B&W or other methods and distributed to multiple destinations. This print task may be divided by a local print system component such as local spooler 150 which can then be sent to remote spooler 152 as multiple print data streams. A print task may also be sent from local spooler 150 to remote spooler 152 as a single print task which is then divided or reconfigured for one or more devices and sent to the print processors 154, 156 associated with the destination devices. In other embodiments, a print task may be sent from local spooler 150 to remote spooler 152 and forwarded to another print system component such as a print processor, which then divides or reconfigures the print task and sends one or more print data streams to the designated destinations.

Print Processor Despooling to a Remote Location Printer-ready mode printing some embodiments of the present invention may employ local and/or remote print processors to enable elements of these embodiments. Some of these embodiments are illustrated in FIG. 7.

Once a user has selected one or more devices (i.e., printers) through a local print system component, such as a print processor, the local print system component may send a message to a remote print system component declaring an intent to despool a print task to one or more printers in communication with the remote print system component.

Figure 7:
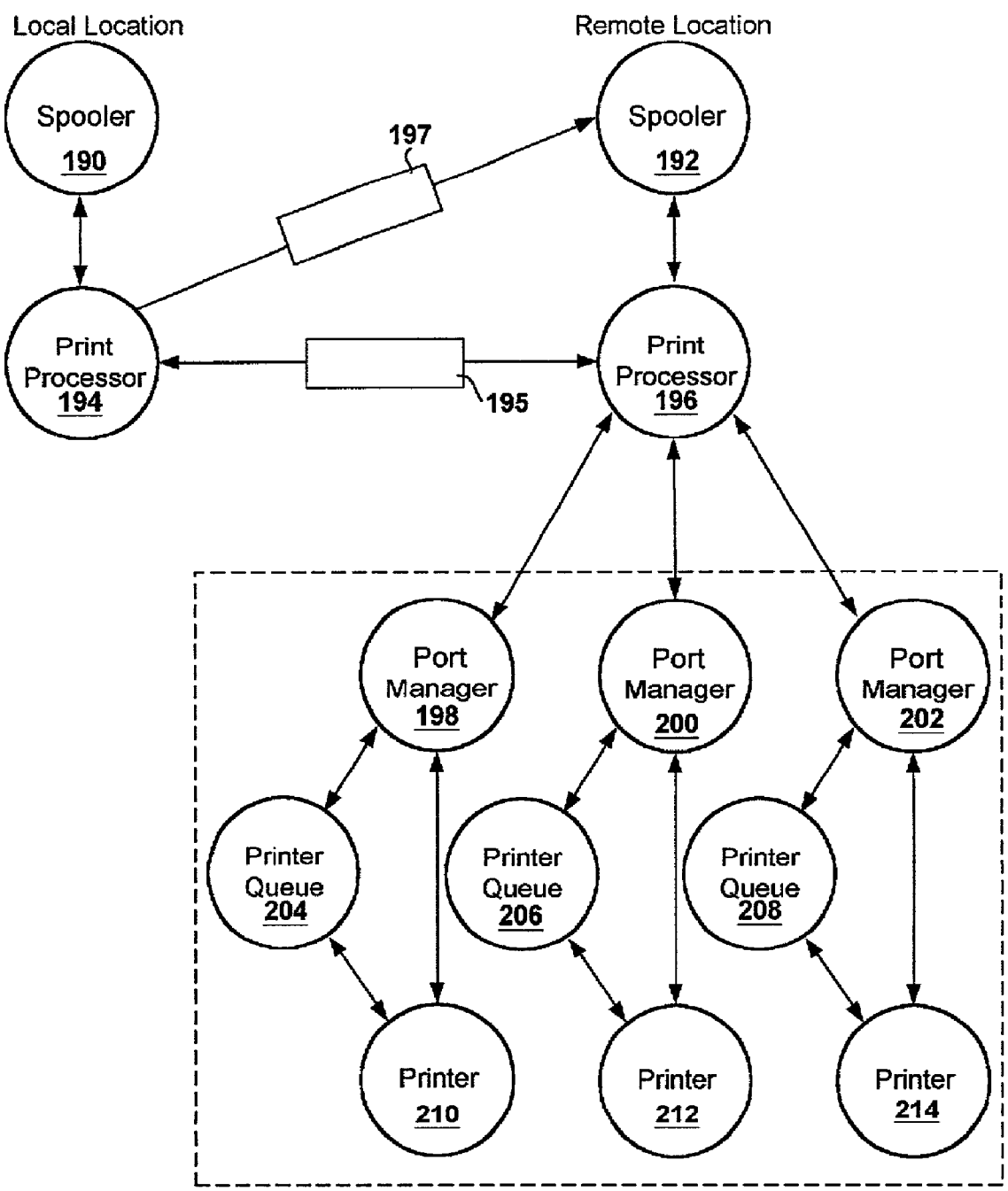
FIG. 7 is a diagram depicting an exemplary print processor-based embodiment despooling printer-ready files to remote devices.

In the exemplary embodiments illustrated in FIG. 7, a print task is despooled from a spooler 190 to a local print processor 194, which sends a message 195, 197 to a remote spooler 192 or a remote print processor 196. Message 195, 197 may comprise print task data which identifies the destination devices and the characteristics of the print task. Message 195,197 may comprise cluster printing data including job splitting and copy splitting data as well as color/B&W separation and alternate or backup printer data.

As a non-limiting example, local print processor 194 may establish bidirectional communication with remote spooler 192 or remote print processor 196 wherein remote spooler 192 or remote print processor 196 query for printers that have the capability to handle a specific print task. Remote spooler 192 or remote print processor 196 may respond by querying its local devices and finding three printers 210, 212, 214 that are capable of printing the print task. Remote spooler 192 or remote print processor 196 may then respond to local print processor 194 by identifying the printers 210, 212, 214 and their capabilities. Remote spooler 192 or remote print processor 196 may then configure the print task for the printers 210, 212, 214 by splitting the print task among the printers 210, 212, 214. This configuration may comprise copy splitting, job splitting or any other print task configuration. Alternatively, local print processor 194 may send instructions to remote spooler 192 or remote print processor 196 to have these components 192, 196 configure a print task for printing on one or more printers and distribute the print task to the correct printers.

Once a print task is configured for the proper printers 210, 212, 214, remote spooler 192 or remote print processor 196 may despool or send the task to the port managers 198, 200, 202 associated with the destination devices 210, 212, 214. In RAW mode printing, remote print processor 196 may forward the RAW mode, printerready data directly to port managers 198, 200, 202 which may then send the print data directly to printers 210, 212, 214 or, when print servers are used, may send the print data to the print queues 204, 206, 208 associated with the destination printers 210, 212, 214.

As in other embodiments described above, a print task may be divided by copy splitting, job splitting or other methods and distributed to multiple destinations. This print task may be divided by a local print system component such as local print processor 194 which can then be sent to remote print processor 196 as multiple print data streams. A print task may also be sent from local print processor 194 to remote print processor 196 as a single print task which is then divided or reconfigured for one or more devices and sent to the port managers 198, 200, 202 associated with the destination devices. In other embodiments, a print task may be sent from local print processor 194 to remote spooler 192 and forwarded to another print system component such as a remote print processor 196, which then divides or reconfigures the print task and sends one or more print data streams to the designated destinations.

Figure 8:
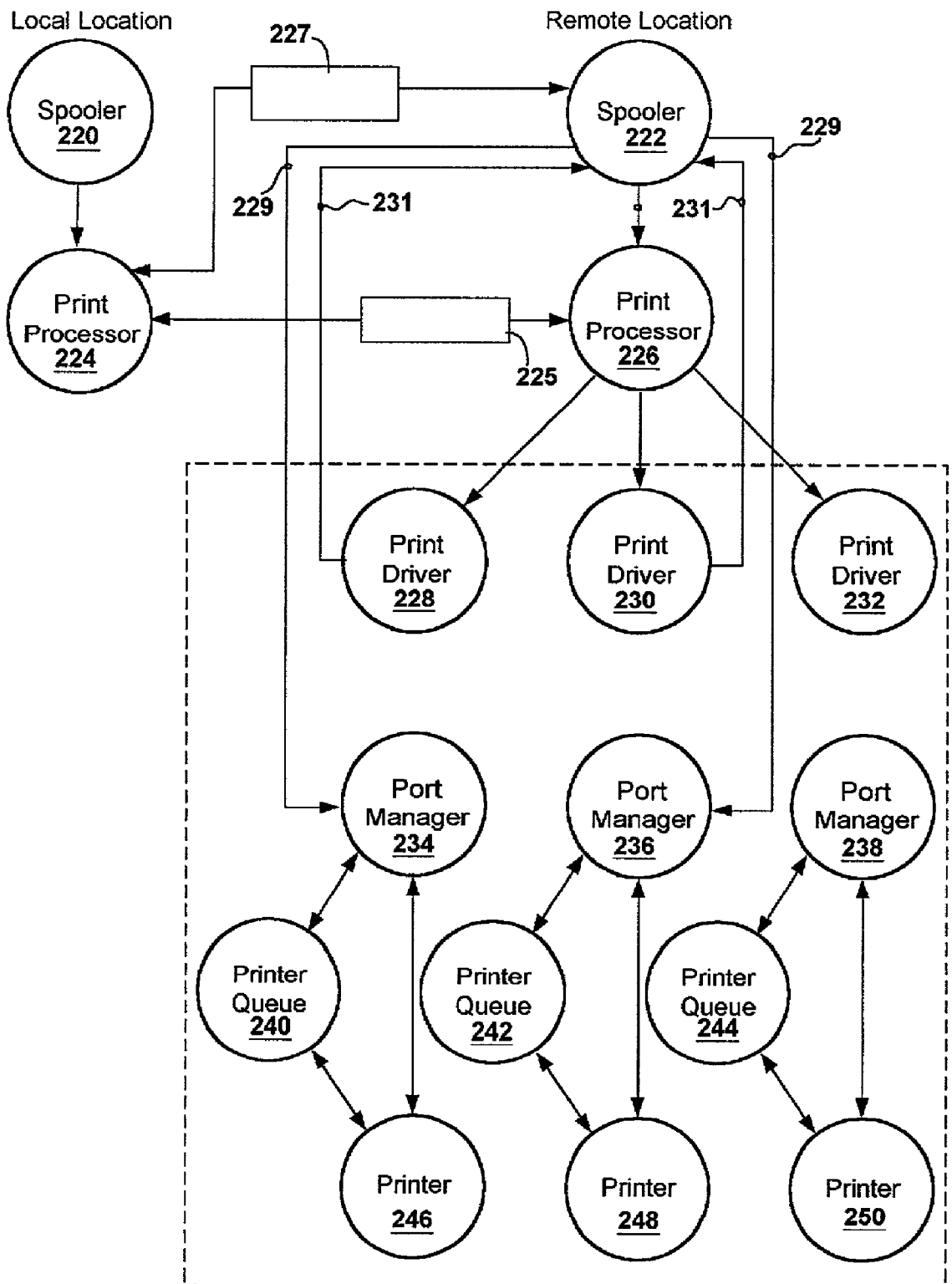
FIG. 8 is a diagram depicting an exemplary print processor-based embodiment despooling journaled files to remote devices.

Print Processor Despooling to a Remote Location Journaled mode printing some embodiments of the present invention, illustrated in FIG. 8, employ journaled print data such as EMF mode data. In these embodiments, journaled data 227 may be sent to a remote spooler 222 and despooled to a remote print processor 226. Alternatively, a local print processor 224 may send journaled print task data 225 to a remote print processor 226, which may divide or reconfigure a print task and distribute it to print paths of one or more printers 246, 248, 250. In the example illustrated in FIG. 8, a print task is split and sent to the print paths of two printers 246 and 248. For journaled mode data, print processor 226 may play back the journaled (i.e., EMF) data to the drivers 228, 230, GDIs and/or other components required to process the journaled data into printer-ready data. This printer-ready data is then sent back to the spooler 222 for despooling 229 to the port managers 234, 236 associated with the destination devices 246, 248. Port managers 234, 236 may send data directly to printers 246, 248 or may use one or more print queues 240, 242, which send print data to printers 246, 248.

As in other embodiments described above, a print task may be divided by copy splitting, job splitting or other methods and distributed to multiple destinations. This print task may be divided by a local print system component such as local print processor 224 and sent to remote spooler 222 or remote print processor 226 as multiple print data streams. A print task may also be sent from local print processor 224 to remote spooler 222 or remote print processor 226 as a single print task which is then divided or reconfigured by the remote print system components 222, 226 for one or more devices and sent to the print processor 226 or drivers 228, 230, 232 or port managers 234, 236, 238 associated with the destination devices. In other embodiments, a print task may be sent from local print processor 224 to remote spooler 222 and forwarded to another print system component such as a print processor 226, which then divides or reconfigures the print task and sends one or more print data streams to the designated destinations.

Figure 9:
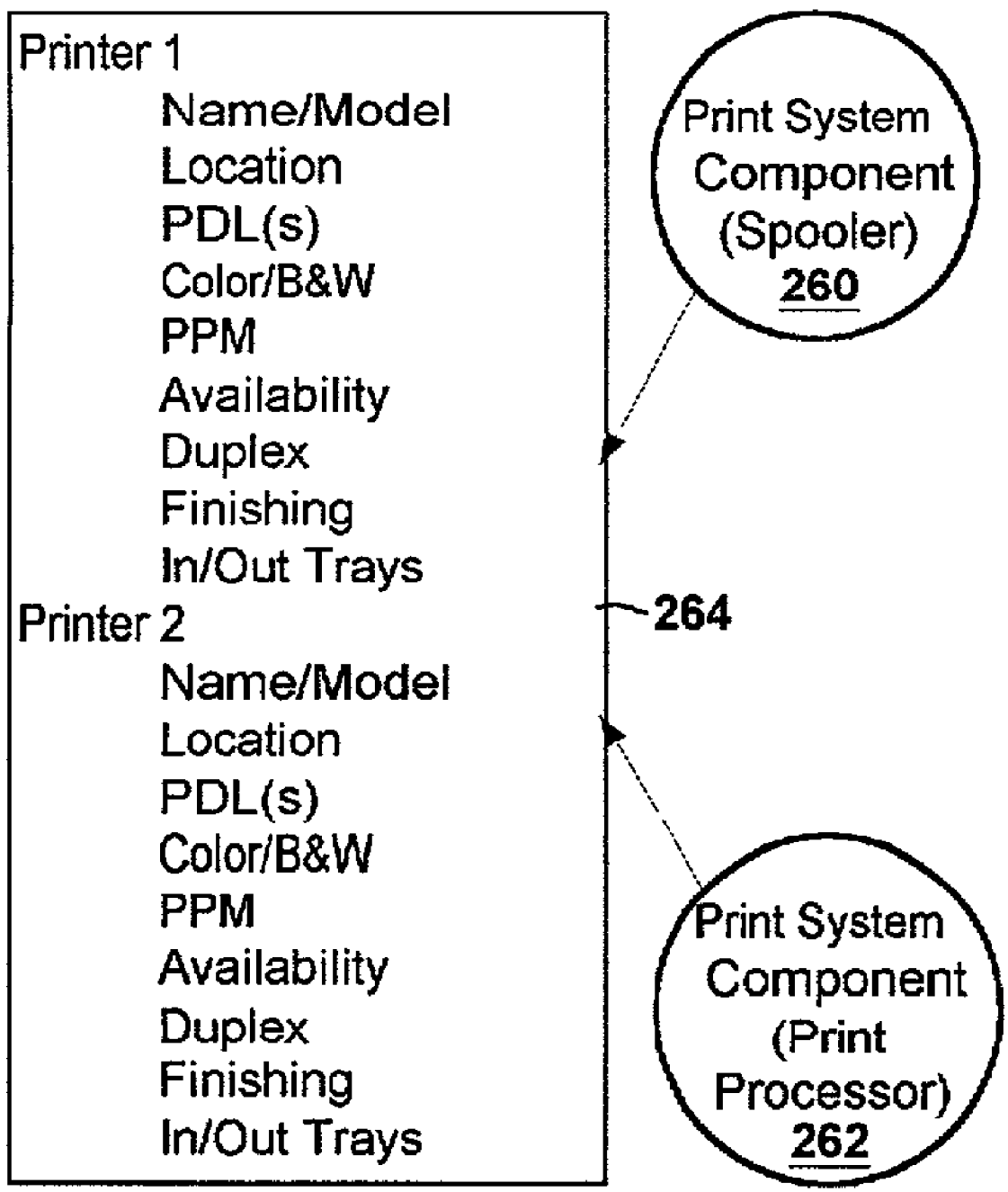
FIG. 9 is a diagram depicting exemplary data that may be returned in response to a query.

In reference to FIG. 9, a print system component of the present invention such as a spooler 260 or print processor 262 may determine the capabilities and availability of a printing device in communication with the print system component 260, 262 through a query or other form of communication. In response to a query or similar communication, a print system component may receive printer suitability data 264 comprising printer capabilities, characteristics and availability. As a non-limiting example, printer suitability data may comprise a printer's name, model, location, Page Description Languages (PDLs), color capabilities, monochrome capabilities, pages per minute (PPM), availability, duplex capabilities, finishing options, in and out tray options, resolution capabilities and other data. Printer suitability data may be compared with print task characteristics to evaluate whether a printer is capable of or suitable for printing a specific print task.

Figure 10:
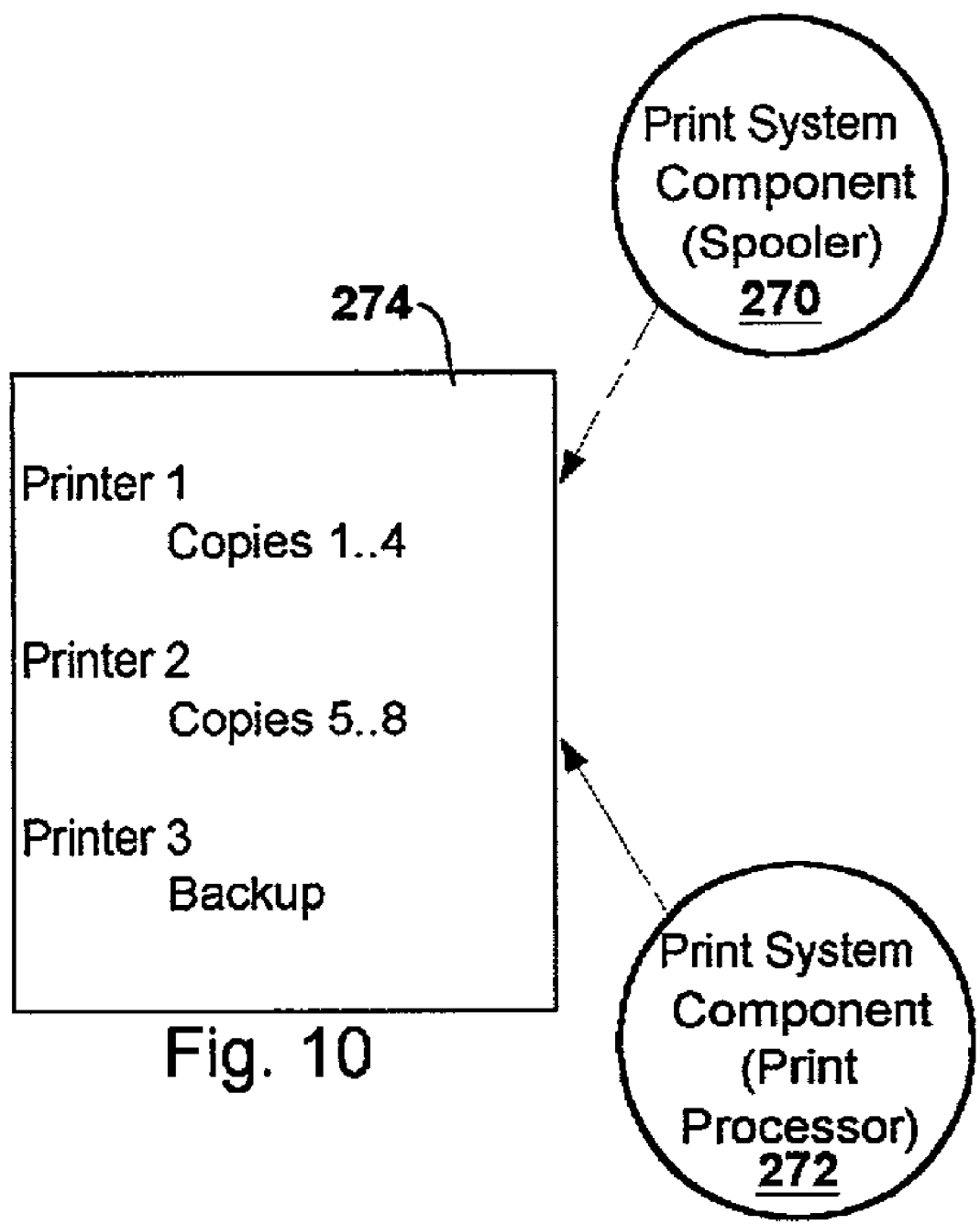
FIG. 10 is a diagram depicting an exemplary distribution of a print task by print system components.

In reference to FIG. 10, a print system component, such as a spooler 270 or a print processor 272 may configure a print task for printing on multiple printers. When multiple printers are available and capable of printing a print task, a print system component 270, 272 may perform job splitting, copy splitting, other cluster printing options or other print task reconfiguration methods to distribute a print task among multiple printers. As a non-limiting example, a print system component 270, 272 may configure a print task comprising 8 copies by sending 4 copies to a first printer, 4 copies to a second printer and reserving a third printer for a backup. Alternatively, a print task may be sent to all three printers for faster printing when all three printers are available.

While elements of exemplary embodiments of the present invention may relate most closely to similar elements in a Microsoft Windows operating system, embodiments of the present invention may function in conjunction with other operating systems such as Apple's Macintosh Operating System, Linux operating systems, System V Unix operating systems, BSD Unix operating systems, OSF Unix operating systems, IBM's Mainframe MVS operating system and many other operating systems and printing environments for computing devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of printing from a computing device, said method comprising:
   receiving a print task at a local print system component in a first network;
   acquiring, by communication between a second-network print system component and said local print system component, printer data for a plurality of second-network printers located in a second network wherein said plurality of second-network printers are not directly accessible to said local print system component, wherein said plurality of second-network printers are not detectable to computing devices in said first network and wherein said plurality of second-network printers are in communication with said second-network print system component located in said second network;
   reconfiguring said print task, wherein said reconfiguring comprises reconfiguring said print task for cluster printing on said plurality of second-network printers;
   sending said reconfigured print task from said local print system component to said second-network print system component in said second network; and
   sending said reconfigured print task, from said second-network print system component in said second network, to said plurality of second-network printers in communication with said second-network print system component for printing.

2. The method of claim 1 wherein said local print system component is a spooler.

3. The method of claim 1 wherein said local print system component is a print processor.

4. The method of claim 1 wherein said second-network print system component is a spooler.

5. The method of claim 1 wherein said second-network print system component is a print processor.

6. The method of claim 1 wherein said reconfiguring is performed via said local print system component.

7. The method of claim 1 wherein said reconfiguring enables said print task to be printed on at least one second-network device.

8. A method of remote printing, said method comprising:
   sending a print task to a local print system component on a first network;
   determining characteristics of said print task;
   determining the availability of a plurality of second-network printing devices located on a second network, wherein said second-network printing devices are not directly accessible to said local print system component and said second-network printing devices are not detectable by computing devices in said first network, said determining being performed via a second-network print system component in said second network, wherein said second-network print system component is in communication with said local print system component;
   determining the capabilities of said plurality of second-network printing devices with said second-network print system component;
   selecting, via said local print system component, at least one of said plurality of second-network printing devices, thereby designating a printer selection;
   reconfiguring said print task for said printer selection;
   sending said print task to said second-network print system component; and
   sending said print task from said second-network print system component to at least one of said plurality of second-network printing devices in said printer selection for printing.

9. The method of claim 8 wherein said determining characteristics is accomplished via said local print system component.

10. The method of claim 8 wherein said determining characteristics is accomplished via said second-network print system component.

11. The method of claim 8 wherein said reconfiguring comprises job splitting among said plurality of second-network devices.

12. The method of claim 8 wherein said reconfiguring comprises copy splitting among said plurality of second-network devices.

13. The method of claim 8 wherein said reconfiguring comprises division of said print task into multiple print tasks for printing on a cluster of said second-network printing devices.

14. The method of claim 8 wherein said reconfiguring comprises changing the destination of a print task.

15. A method of remote printing, said method comprising:
sending a print task to a local print system component on a first network;
determining a device requirement of said print task;
sending said device requirement to a second-network print system component on a second network that does not share devices with said first network, wherein printing devices on said second network are not detectable by computing devices on said first network;
checking, with said second-network print system component, the availability of a plurality of second-network printing devices on said second network, wherein said plurality of second-network printing devices is not directly accessible to said local print system component, but said plurality of second-network printing devices is in communication with said second-network print system component;
determining, with said second-network print system component, the capability of said plurality of second-network printing devices to meet said device requirement;
automatically selecting at least one of said plurality of second-network printing devices;
reconfiguring said print task for said selected at least one second-network printing device;
sending said print task to said selected at least one second-network printing device.

16. A system for remote printing, said system comprising:
a local print task receiver for receiving a print task from a local computing device on a first network;
a print task analyzer for determining a print task requirement;
a second-network printer data acquirer for acquiring printer data for a plurality of second-network printers on a second network that does not share printers with devices on said first network, wherein printing devices on said second network are not detectable by computing devices on said first network;
a print task distributor for distributing said print task to a second-network print system component on said second network;
a printer selector for comparing printer data with said print task requirement and for selecting at least one of said plurality of second-network printers based on said comparing; and
a print task reconfigure for reconfiguring said print task for said at least one of said plurality of second-network printers selected by said printer selector.

17. A computer readable medium comprising computer-readable instructions for performing functions within a print system component, said instructions comprising the acts of:
receiving a print task from a device on a first network;
determining print task characteristics;
sending print task characteristic data to a second-network print system component on a second network that does not share devices with said first network, wherein printing devices on said second network are not detectable by computing devices on said first network;
receiving printer data from said second-network print system component, said printer data identifying second-network printers on said second network that are capable of printing said print task;
selecting at least one of said second-network printers capable of printing said print task;
reconfiguring said print task for said selected at least one second-network printers;
sending said print task to said second-network print system component; and
sending said print task from said second-network print system component to said at least one of said second-network printers selected in said selecting.

* * * * *